United States Patent
Chan et al.

(10) Patent No.: US 6,445,785 B1
(45) Date of Patent: *Sep. 3, 2002

(54) METHODS AND APPARATUS FOR LOCAL NUMBER PORTABILITY IN TELECOMMUNICATION SYSTEMS

(75) Inventors: May Y. Chan, Waltham, MA (US); Blayne E. Maring; David Chin-Che Wang, both of Coppell, TX (US); I-Hsiang Yu, Lexington, MA (US)

(73) Assignees: Verizon Laboratories Inc., Waltham, MA (US); Verizon Corporate Services Group Inc., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/573,080

(22) Filed: Dec. 15, 1995

Related U.S. Application Data

(60) Provisional application No. 60/007,400, filed on Nov. 21, 1995.

(51) Int. Cl.$^7$ .................... H04M 3/42; H04M 7/00
(52) U.S. Cl. .................... 379/221.13; 379/201.01; 379/207.02; 379/207.11; 379/207.12; 379/221.14
(58) Field of Search .................... 379/67, 88, 89, 379/202, 207, 201, 220, 221, 230, 112, 114, 213, 201.01, 201.07, 201.08, 201.12, 207.02, 207.11, 207.12, 211.02, 212.01, 219, 220.01, 221.01, 221.02, 221.08, 221.13, 221.14

(56) References Cited

U.S. PATENT DOCUMENTS

| | | | | |
|---|---|---|---|---|
| 4,754,479 A | * | 6/1988 | Bicknell et al. | 379/207 |
| 5,272,749 A | * | 12/1993 | Masek | 379/216 |
| 5,278,889 A | * | 1/1994 | Papanicolaou et al. | 379/53 |
| 5,287,403 A | * | 2/1994 | Atkins et al. | 379/144 |
| 5,333,184 A | * | 7/1994 | Doherty et al. | 379/115 |
| 5,553,130 A | * | 9/1996 | Turner | 379/220 |
| 5,598,464 A | * | 1/1997 | Hess et al. | 379/213 |
| 5,661,792 A | * | 8/1997 | Akinpelu et al. | 379/221 |
| 5,703,939 A | * | 12/1997 | Bushnell | 379/113 |
| 5,717,749 A | * | 2/1998 | Sneed, Jr. et al. | 379/207 |
| 5,764,745 A | * | 6/1998 | Chan et al. | 379/207 |
| 5,793,857 A | * | 8/1998 | Barnes et al. | 379/207 |

OTHER PUBLICATIONS

R.B. Hirsch, "Detailed Draft Outline for Sect. 7.3 of the Workshop Doc," A Database Architecture for Number Portability, INC Number Portability Workshop, Dec. 15, 1994, 4 pages.

P.K. Bhagat, "AT&T's Proposal for Local Number Portability", INC, Number Portability Workshop, Jun. 28, 1995, pp. 1–15.

(List continued on next page.)

Primary Examiner—Allan Hoosain
(74) Attorney, Agent, or Firm—Leonard Charles Suchyta; James K. Weixel

(57) ABSTRACT

A telecommunication system supports local number portability. The system includes a local number portability switch and a local number portability database accessible by the local number portability switch. The local number portability database contains a table for translating geographic numbers to routing information. The local number portability switch queries the local number portability database using a dialed geographic number in response to initiation of a call. The local number portability database translates the dialed geographic number to corresponding routing information and returns the corresponding routing information to the local number portability switch. The local number portability switch uses the corresponding routing information to route the call.

39 Claims, 13 Drawing Sheets

OTHER PUBLICATIONS

J.C. Brownley, "A Database Solution to Number Portability", INC Number Portability Workshop, Jun. 28, 1995, pp. 1–10.

P.K. Bhagat, AT&T's Proposal for Local Number Portability, Location Routing Number (LRN), Jun. 28, 1995, pp. 1–17.

Number Portability Agenda, AT&T NP Team 6/95, 31 pages.

S.L. Ackley, PE, "Local Number Portability (LNP) (An AIN 0.1 Database Service) Fourth Contribution" Electric Lightwave, Inc., Jan. 24, 1995, pp. 1–8.

M.D. Foster, "Local Area Number Portability. An Overview", Stratus, Mar. 2, 1995, pp. 1–26.

* cited by examiner

METHODS AND APPARATUS FOR LOCAL NUMBER PORTABILITY IN TELECOMMUNICATION SYSTEMS

CROSS REFERENCE TO RELATED APPLICATION

This application claims the benefit of provisional application Serial No. 60/007,400 filed Nov. 21, 1995.

FIELD OF THE INVENTION

This invention relates to local number portability in telecommunication systems and, more particularly, to a local number portability architecture that supports service provider portability, location portability and service portability.

BACKGROUND OF THE INVENTION

Presently, a telephone subscriber's directory number is usually a geographic North American Numbering Plan (NANP) number having the NPA-NXX-XXXX format. In this format, NPA is the number plan area, or area code, NXX is the central office code and XXXX identifies the station number. This geographic number (GN) identifies the subscriber as well as the physical location of the subscriber's terminal. The geographical information is derived from the NPA+NXX, which uniquely identifies the subscriber's central office. When a telephone user subscribes to telephone services from a particular central office, he or she is assigned a station number with the NPA+NXX of that central office. As a result, it is not possible for telephone users to retain their directory number when they are served by another central office, such as is the case when they move or change service providers.

At present, telephone subscribers have many choices of long distance carriers. Each long distance carrier sets its own rates and separately bills the subscriber. However, telephone subscribers presently have no choice with respect to local telephone service. For example, in the New England area, all local service is provided by NYNEX. In order to introduce competition into the local service market so that a subscriber may select from several local service providers, alternative service providers may own and/or operate switching offices within a local area. However, the present numbering plan described above is not compatible with multiple service providers in a local area. If a subscriber changed service providers, it would be necessary to change directory numbers. To overcome these difficulties, the concept of local number portability has been introduced.

Local number portability (LNP) is a telecommunication service that offers subscribers service provider portability, location portability and service portability. Service provider portability gives subscribers the ability to obtain local telephone service from any service provider that offers services in the subscriber's area, while retaining the same telephone number. Location portability permits subscribers to retain their telephone number when they relocate to a new location outside the serving area of their serving central office. Today, subscribers can retain their telephone number only when they relocate within the serving area of their current serving central office. Service portability allows subscribers to obtain any available telecommunication services, regardless of the capabilities of their current serving central office, while retaining their telephone number. Currently, the service features available to subscribers are determined by the capabilities of their current service central office.

A technique known as "foreign exchange" has been used by local telephone companies to support location portability beyond the coverage area of the serving office. This technique allows a telephone subscriber to keep his or her telephone number when he or she moves to a new location within a given distance from the old location. The subscriber pays a monthly fee for this service. Part of the monthly fee is tariffed based on the distance between the old serving end office and the new serving end office. The foreign exchange service physically connects the telephone user's phone at the new location to the previous serving end office. Therefore, the telephone user is actually served by the previous serving end office. The line that connects the telephone user's phone to the previous serving end office typically consists of a trunk circuit between the previous serving end office and the local end office that serves the foreign exchange service subscriber. As a result, significant network resources are required to serve a single subscriber.

The foreign exchange service is typically very expensive. In addition, people living in the same area as the foreign exchange subscriber, such as a next door neighbor, are required to pay toll charges when they call the foreign exchange subscriber. To avoid this situation, the foreign exchange subscriber may need to have another phone line with a local telephone number. This means a second telephone number and another monthly fee.

The foreign exchange service has a distance limitation. It cannot be offered if the serving end office and the telephone user are located in different LATA's. Even though the foreign exchange service expands the scope of location portability from within the coverage area of the serving end office to within a LATA, it is not a robust location portability service. The telephone company needs to provide additional facilities to support foreign exchange service, because the telephone user's phone is physically connected to the previous serving end office. The foreign exchange technique inefficiently uses network resources. Furthermore, service provider portability is not supported by this technique.

SUMMARY OF THE INVENTION

According to the present invention, methods and apparatus for telecommunication call processing with local number portability are provided. The method for call processing comprises providing a local number portability switch and a local number portability database accessible by the local number portability switch. The local number portability database contains a table for translating geographic numbers to routing information. The local number portability switch queries the local number portability database using a dialed geographic number in response to initiation of a call. The local number portability database translates the dialed geographic number to corresponding routing information and returns the corresponding routing information to the local number portability switch, and the local number portability switch uses the corresponding routing information to route the call.

The local number portability database may comprise a global local number portability database for translating the dialed geographic number to a routing number. The global local number portability database can be a single physically large database containing all subscriber information; the subscriber information can be copied into several physical databases; or the subscriber information can be partitioned into several physical databases. In another configuration, the local number portability database may comprise a global database for translating the dialed geographic number to intermediate routing information, such as a service provider identification, a carrier identification code and/or a trunk group identification, or an intermediate switch address. The intermediate routing information may be used to query a service provider database, which translates the dialed geographic number to a routing number, or used to route the call to an intermediate switch, which can query a service provider database. Each service provider database contains routing numbers for its own subscribers. In another configuration, each service provider database contains combined routing information, including routing numbers for its own subscribers and intermediate routing information for subscribers of other service providers.

In one embodiment, the routing number identifies a destination switch corresponding to the dialed geographic number. In another embodiment, the routing number uniquely identifies the destination switch and the subscriber corresponding to the dialed geographic number.

According to another aspect of the invention, apparatus for telecommunication call processing comprises a local number portability switch and a local number portability database accessible by the local number portability switch. The local number portability switch can be an originating switch, an intermediate switch or a destination switch that has query capability. The local number portability database can be a global database, a service provider database or a combined service provider database. The local number portability switch includes means responsive to initiation of a call for querying the local number portability database using a dialed geographic number. The local number portability database includes means for translating the dialed geographic number to corresponding routing information and means for returning the corresponding routing information to the local number portability switch. The local number portability switch includes means responsive to the corresponding routing information for routing the call.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
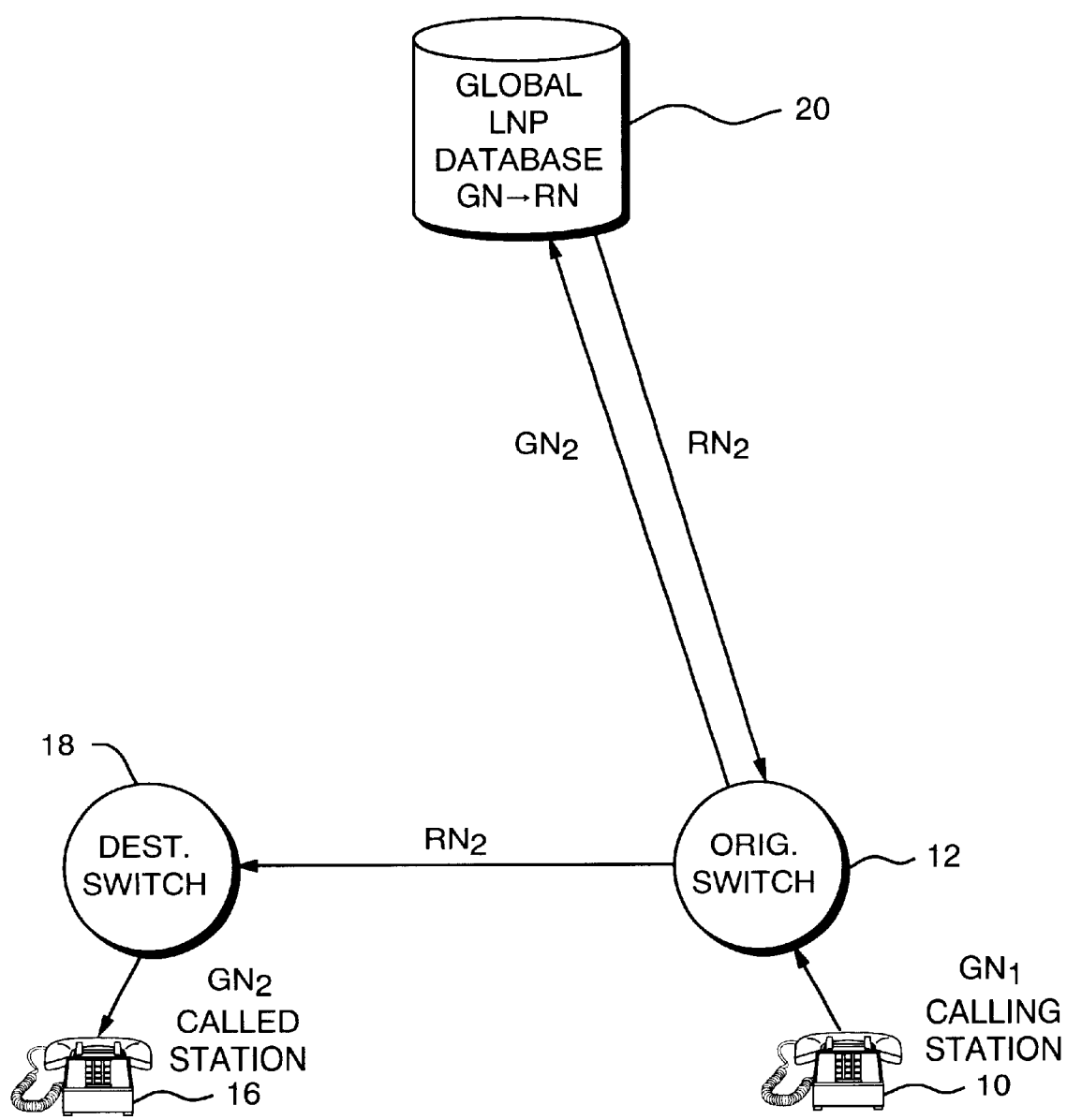
FIG. 1 is a block diagram of a telecommunication system having local number portability in accordance with a first embodiment of the invention.

The present invention provides methods and apparatus for telecommunication call processing to support local number portability. The NANP number assigned to a subscriber, which presently represents the geographic location of the subscriber, is utilized in the local number portability scheme. The subscriber directory number is referred herein as the subscriber's "geographic number". However, because the subscriber's directory number is fully portable, it no longer represents the geographic location of the subscriber. Thus, for example, a subscriber may relocate from Massachusetts to Arizona, but will maintain the same geographic number (GN).

Because the subscriber's geographic number utilized in accordance with the invention represents a subscriber rather than a geographic location, it is necessary to obtain call routing information from a database. The database translates a dialed geographic number to routing information and returns the routing information to a local number portability switch that requires the routing information for routing the call. As shown and described herein, a variety of different configurations may be utilized within the scope of the present invention. The database may be a single database, a distributed database or a partitioned database. The database may be maintained by an independent entity or may be maintained by service providers. The database query may involve a single translation from a dialed geographic number to routing information, or may involve intermediate steps. The database query may involve obtaining information from one or more databases. In each case, however, the geographic number is mapped to routing information, and the routing information is used by the public switched telephone network to complete the call.

A first embodiment of the invention is described with reference to FIGS. 1 and 2. A calling station 10 having a geographic number $GN_1$ is connected to an originating switch 12, and a called station 16 having a geographic number $GN_2$ is connected to a destination switch 18. The originating switch 12 has access to a global LNP database 20. The originating switch 12 and the destination switch 18 may be any stored program controlled switch that is designed for use in the public switched telephone network.

The global LNP database 20 is a single logical database. In practice, the data of the single logical database may be distributed or partitioned into several physical databases. The global LNP database 20 translates each geographic number GN to a local number portability routing number RN. As described below, the routing number may be a physical address representing the geographical location of the serving switch of the dialed geographic number. Alternatively, the routing number may uniquely identify the called station. The global LNP database 20 is preferably distributed in order to limit the volume of incoming traffic. In one approach, the global LNP database is distributed regionally, and each database location contains all information necessary to translate geographic numbers to routing numbers for the entire system. In another approach, the global LNP database is partitioned so that different geographic number groups are assigned to different sections of the database.

Figure 2:
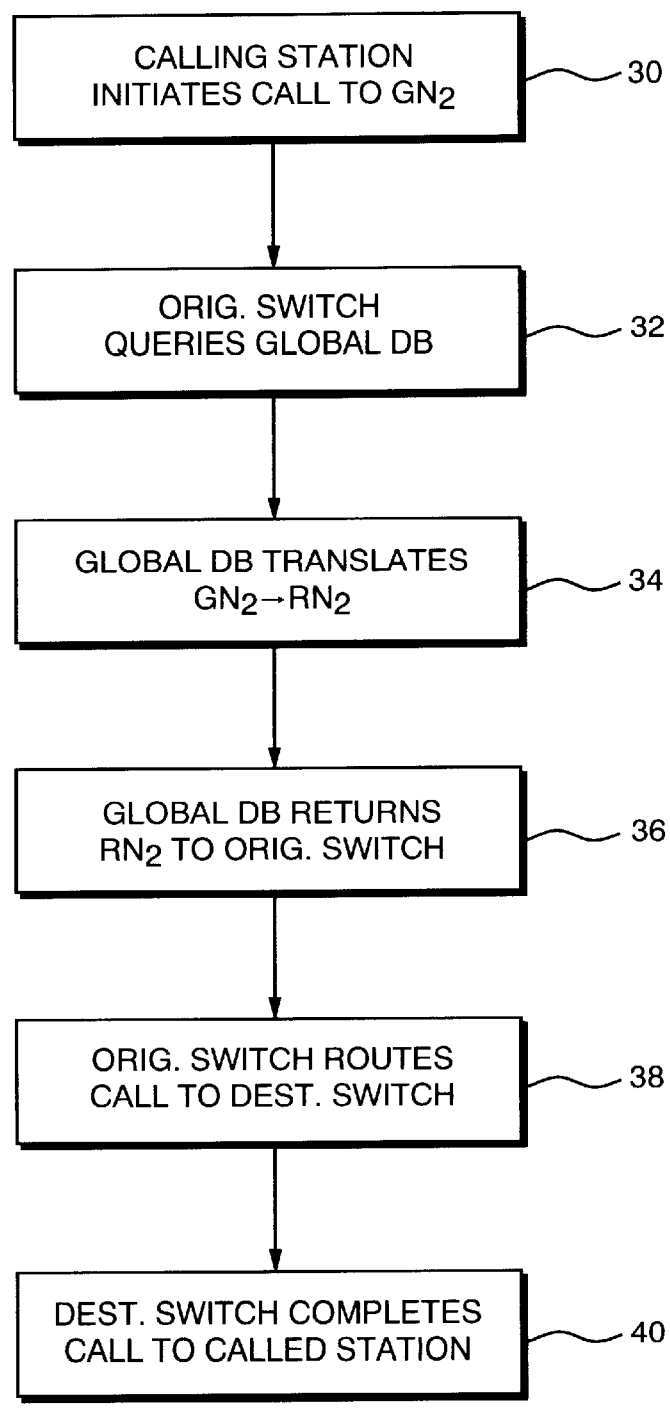
FIG. 2 is a flow diagram illustrating call processing in the telecommunication system of FIG. 1.

Call processing in the telecommunication system of FIG. 1 is described with reference to the flow diagram of FIG. 2.

When calling station 10 initiates a call to called station 16 in step 30, the geographic number $GN_2$ of the called station 16 is received by the originating switch 12. The originating switch 12 queries the global LNP database 20 by forwarding the dialed geographic number $GN_2$ to database 20 in step 32. The global LNP database 20 contains a table for translating geographic numbers to routing numbers. Thus, for each valid geographic number, there is a corresponding routing number. The global LNP database 20 searches the table in order to translate the dialed geographic number $GN_2$ to a corresponding routing number $RN_2$ in step 34. The routing number may be a unique address of the destination switch or a geographic number that is uniquely assigned to the local number portability subscriber served by the destination switch. The global LNP database 20 then returns the routing number $RN_2$ to the originating switch 12 in step 36. The routing number $RN_2$ identifies at least the destination switch 18 with which the called station 16 is associated. The originating switch 12 routes the call to the destination switch 18 in step 38. The information forwarded to the destination switch 18 includes the routing number $RN_2$ and may include the dialed geographic number $GN_2$, depending on the information contained in the routing number $RN_2$. The information forwarded by the originating switch 12 to the destination switch 18 is discussed in detail below. In step 40, destination switch 18 uses the routing information received from originating switch 12 to complete the call to called station 16.

It can be seen that the telecommunication system shown in FIG. 1 and described above provides local number portability. Thus, the subscriber associated with the called station may relocate geographically or may select a different service provider in the same or a different geographic location. In either case, the geographic number $GN_2$ remains associated with the subscriber. When the subscriber having geographic number $GN_2$ relocates, changes service providers or subscribes to new services, he or she is connected to a different switch. Proper call routing to the new switch is effected by changing the routing number $RN_2$ corresponding to geographic number $GN_2$ in the global LNP database 20.

A second embodiment of a telecommunication system in accordance with the present invention is described with reference to FIGS. 3 and 4. A calling station 110 having a geographic number $GN_1$ is connected to an originating switch 112, and a called station 116 having a geographic number $GN_2$ is connected to a destination switch 118. The originating switch 112 has access to a global LNP database 120 and to a service provider X database 124. The global LNP database 120 is similar to the global LNP database 20 shown in FIG. 1, but contains a table for mapping each geographic number to a corresponding service provider identification (SPID). Each service provider has a database for translating the geographic numbers of its own subscribers to routing numbers. Only one service provider database is shown in FIG. 3.

Figure 3:
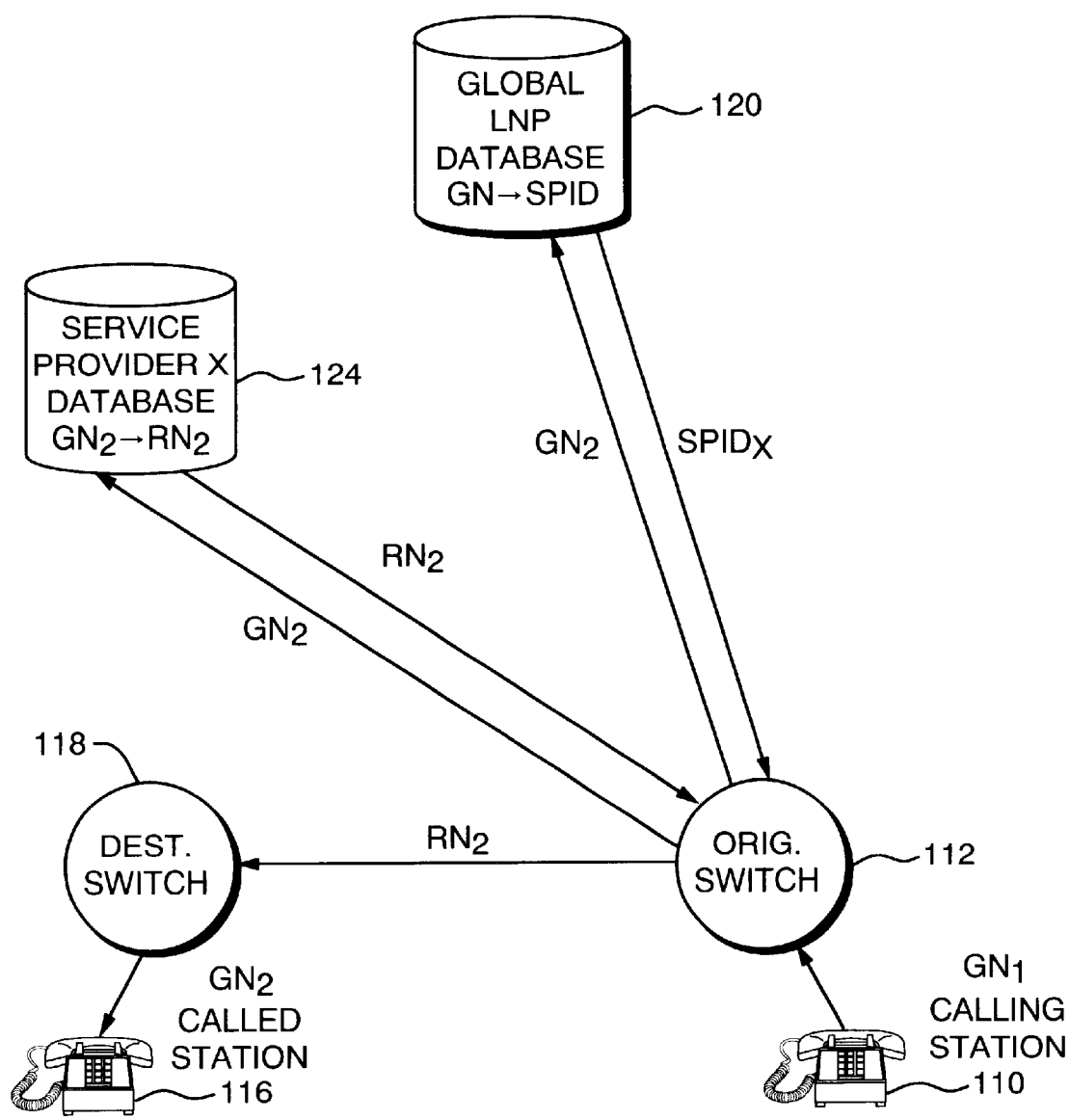
FIG. 3 is a block diagram of a telecommunication system having local number portability in accordance with a second embodiment of the invention.
Figure 4:
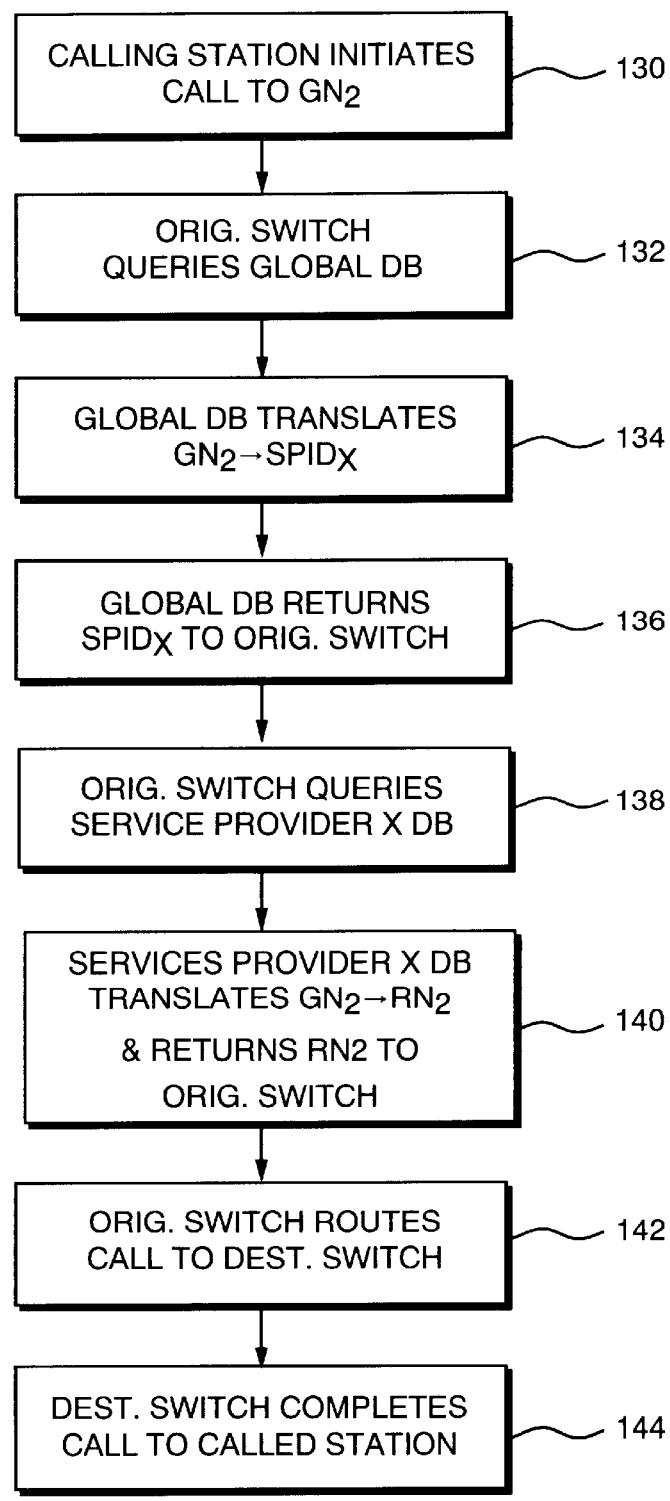
FIG. 4 is a flow diagram illustrating call processing in the telecommunication system of FIG. 3.

Call processing in the telecommunication system of FIG. 3 is described with reference to the flow diagram of FIG. 4. The calling station 110 initiates a call to called station 116 at geographic number $GN_2$ in step 130. The originating switch 112 queries the global LNP database 120 in step 132 by forwarding the dialed geographic number $GN_2$ to the database 120. The global LNP database 120 translates the dialed geographic number $GN_2$ to a corresponding service provider identification $SPID_X$ in step 134. The service provider identification uniquely identifies the service provider with which the subscriber having geographic number $GN_2$ is associated. The global LNP database 120 returns the value of $SPID_X$ to the originating switch 112 in step 136. The originating switch then queries service provider X database 124 by forwarding the dialed geographic number $GN_2$ to database 124 in step 138. The service provider X database 124 translates the dialed geographic number $GN_2$ to corresponding routing number $RN_2$ and returns the routing number $RN_2$ to the originating switch 112 in step 140. As noted above, the service provider X database 124 contains only the routing numbers for its own subscribers. The originating switch 112 then routes the call to the destination switch 118 by forwarding the routing number $RN_2$ and any necessary additional information to destination switch 118 in step 142. The destination switch 118 completes the call to the called station 116 in step 144.

It is apparent that the configuration shown in FIG. 3 requires an additional database query as compared with the system of FIG. 1. However, an advantage of the system of FIG. 3 is that the global LNP database 120 contains only the service provider identification corresponding to each geographic number. Thus, if a subscriber changes locations but utilizes the same service provider, it is not necessary to update the global LNP database 120. Instead, the corresponding service provider updates it own database to reflect the new routing number of the subscriber who has changed locations. As a result, updating of routing information is simplified in the configuration of FIG. 3.

Figure 5:
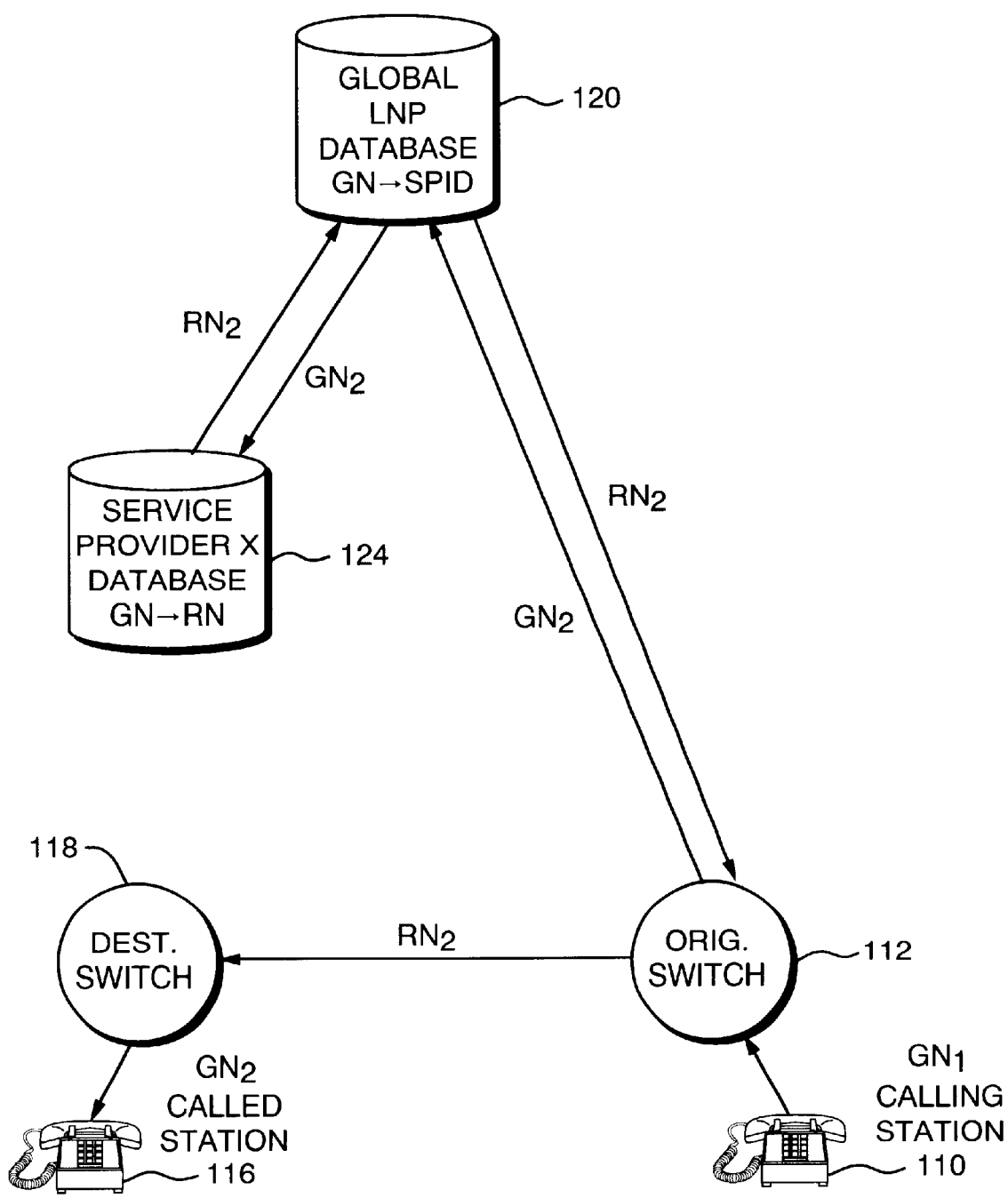
FIG. 5 is a block diagram of a telecommunication system having local number portability in accordance with a third embodiment of the invention.
Figure 6:
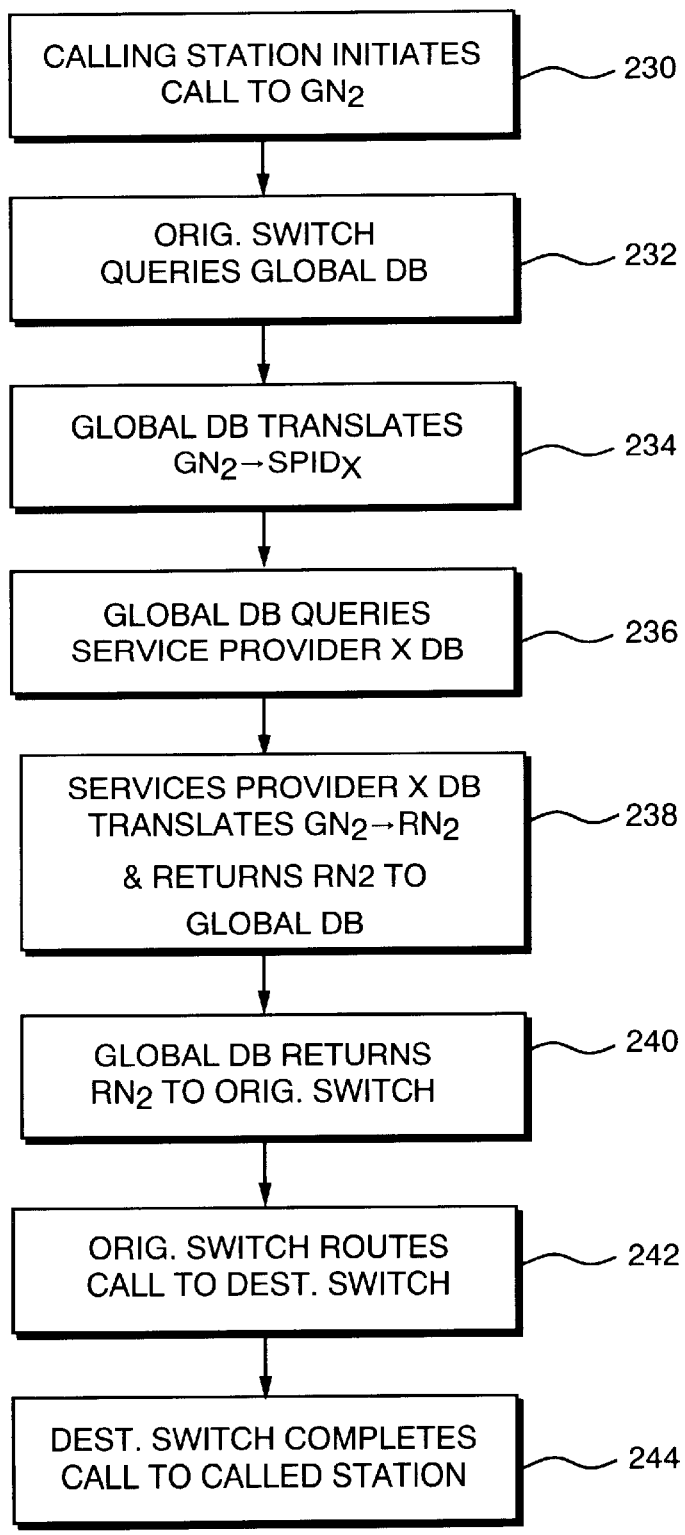
FIG. 6 is a flow diagram illustrating call processing in the telecommunication system of FIG. 5.

A telecommunication system in accordance with a third embodiment of the invention is described with reference to FIGS. 5 and 6. The configuration of FIG. 5 is a variation of the configuration of FIG. 3. In the configuration of FIG. 5, the global LNP database 120 accesses the service provider X database 124 to obtain routing information. As noted previously, each service provider has a database containing a table for converting geographic numbers of its own subscribers to routing numbers. The global LNP database 120 contains a table for translating geographic numbers to service provider identifications.

Call processing in the telecommunication system of FIG. 5 is described with reference to the flow diagram of FIG. 6. The calling station 110 initiates a call to called station 116 by dialing the geographic number $GN_2$ of called station 116 to originating switch 112 in step 230. The originating switch 112 queries the global LNP database 120 in step 232 by forwarding the dialed geographic number $GN_2$ to the database 120. The global LNP database 120 translates the dialed geographic number $GN_2$ to the corresponding service provider identification $SPID_X$ in step 234. In step 236, the global LNP database 120, using the $SPID_X$ information, queries service provider X database 124 by forwarding the dialed geographic number $GN_2$ to database 124. As noted previously, the service provider X database 124 contains only the routing numbers for its own subscribers. In step 238, the service provider X database 124 translates the dialed geographic number $GN_2$ to corresponding routing number $RN_2$ and returns the routing number $RN_2$ to the global LNP database 120. In step 240, the global LNP database 120 returns the routing number $RN_2$ to originating switch 112. The originating switch 112 routes the call to the destination switch 118 in step 242 by using routing number $RN_2$ and forwarding any other necessary information to destination switch 118. In step 244, the destination switch 118 completes the call to called station 116.

A telecommunication system in accordance with a fourth embodiment of the invention is described with reference to FIGS. 7 and 8. A calling station 310 is connected to an originating switch 312. The originating switch 312 may access an LNP database 320 which contains a table for translating a dialed geographic number $GN_2$ to a carrier identification code (CIC) and/or a trunk group identification (TGID), which identify a particular carrier or trunk group, or an intermediate switch address (ISA), which identifies an intermediate switch of the LNP service provider. The LNP database 320 may be a global LNP database or a combined service provider database (as described below) which provides the required CIC and/or TGID, or ISA. The originating switch 312 in this embodiment routes a call to a destination switch 318 through an intermediate switch 322. The dialed geographic number $GN_2$ is passed to the intermediate switch. The intermediate switch 322 has access to a service provider X database 324, which contains a table for translating geographic numbers to routing numbers. The destination switch 318 is connected to a called station 316 having a geographic number $GN_2$.

Figure 7:
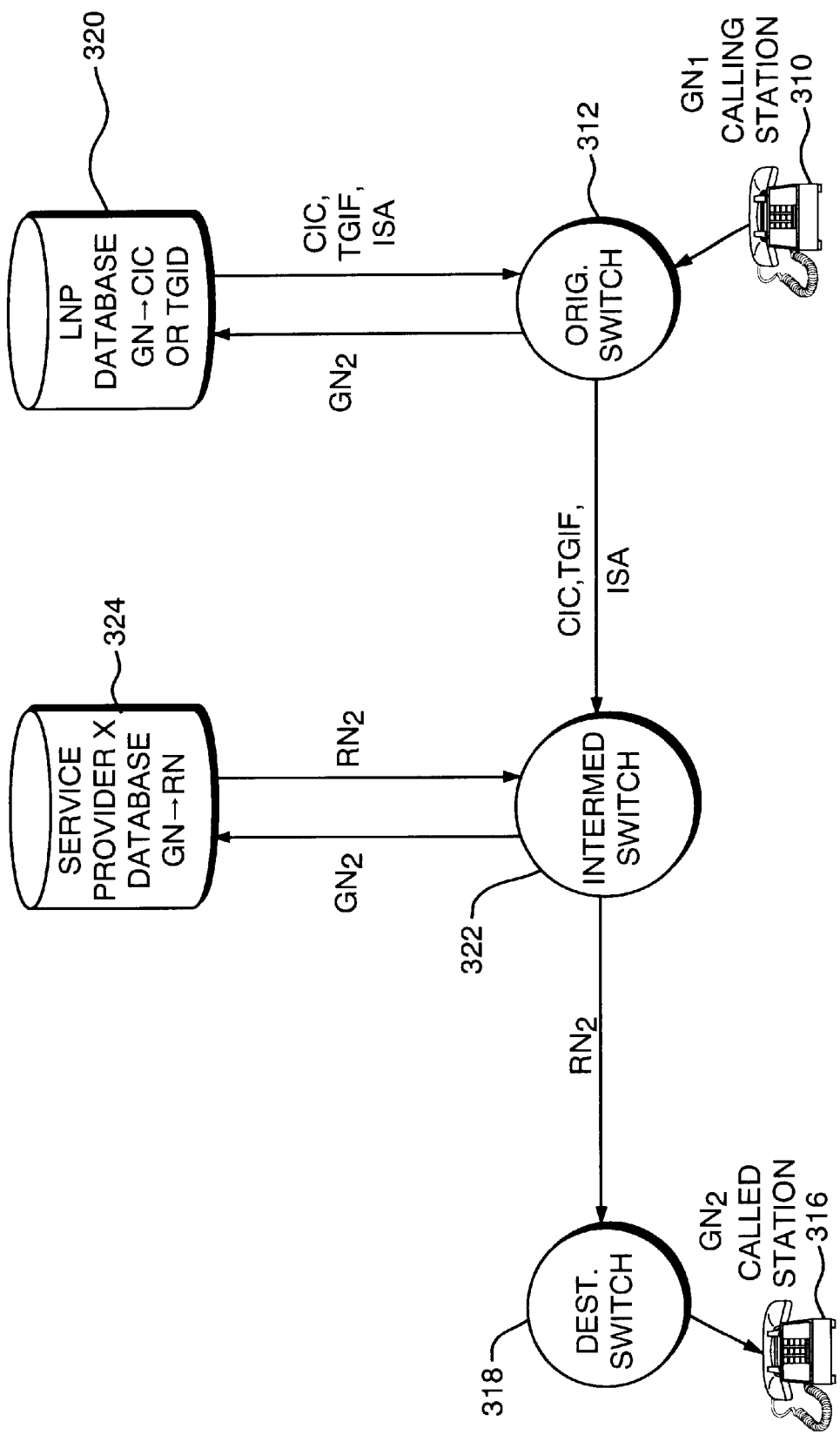
FIG. 7 is a block diagram of a telecommunication system having local number portability in accordance with a fourth embodiment of the invention.
Figure 8:
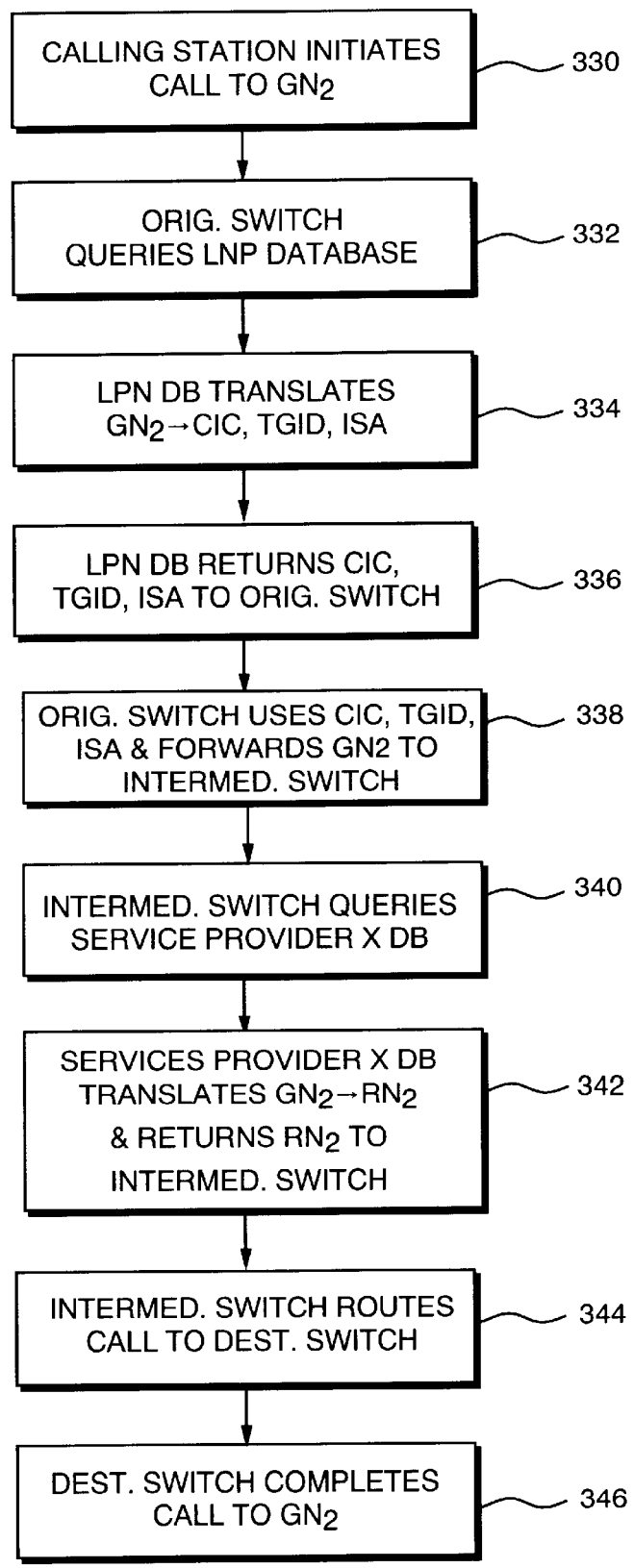
FIG. 8 is a flow diagram illustrating call processing in the telecommunication system of FIG. 7.

Call routing in the telecommunication system of FIG. 7 is described with reference to the flow diagram of FIG. 8. The calling station 310 initiates a call to called station 316 by forwarding dialed geographic number $GN_2$ to originating switch 312 in step 330. The originating switch 312 queries the LNP database 320 by forwarding the dialed geographic number $GN_2$ to database 320 in step 332. The LNP database 320 translates the dialed geographic number $GN_2$ to a carrier identification code CIC and/or a trunk group identification TGID, or an intermediate switch address ISA, in step 334. The CIC and/or TGID, or the intermediate switch address ISA, can be used to route the call to intermediate switch 322. The configuration of FIG. 7 is utilized when it is desired to process the call in a particular intermediate switch. The LNP database 320 returns the CIC and/or TGID, or the intermediate switch address ISA, to the originating switch 312 in step 336. The originating switch uses the CIC and/or TGID, or the intermediate switch address ISA and forwards the dialed geographic number $GN_2$ to intermediate switch 322 in step 338. The intermediate switch 322 queries service provider X database 324 by sending the dialed geographic number $GN_2$ to database 324 in step 340. The service provider X database 324 translates the dialed geographic number $GN_2$ to corresponding routing number $RN_2$ and returns routing number $RN_2$ to the intermediate switch 322 in step 342. The intermediate switch 322 routes the call to destination switch 318 by forwarding the routing number $RN_2$ and any other necessary information to destination switch 318 in step 344. The destination switch 318 completes the call to the called station 316 in step 346.

The telecommunication systems described above utilize a global LNP database which contains routing numbers or which contains intermediate routing information for accessing routing numbers in a service provider database. In additional embodiments of the invention, each service provider has a combined database with sufficient routing information to route calls or to access another service provider database for obtaining routing numbers. Typically, each combined service provider database contains routing numbers for its own subscribers and intermediate routing information, such as a service provider identification, a CIC, a TGID or an intermediate switch address, for subscribers of other service providers.

Figure 9:
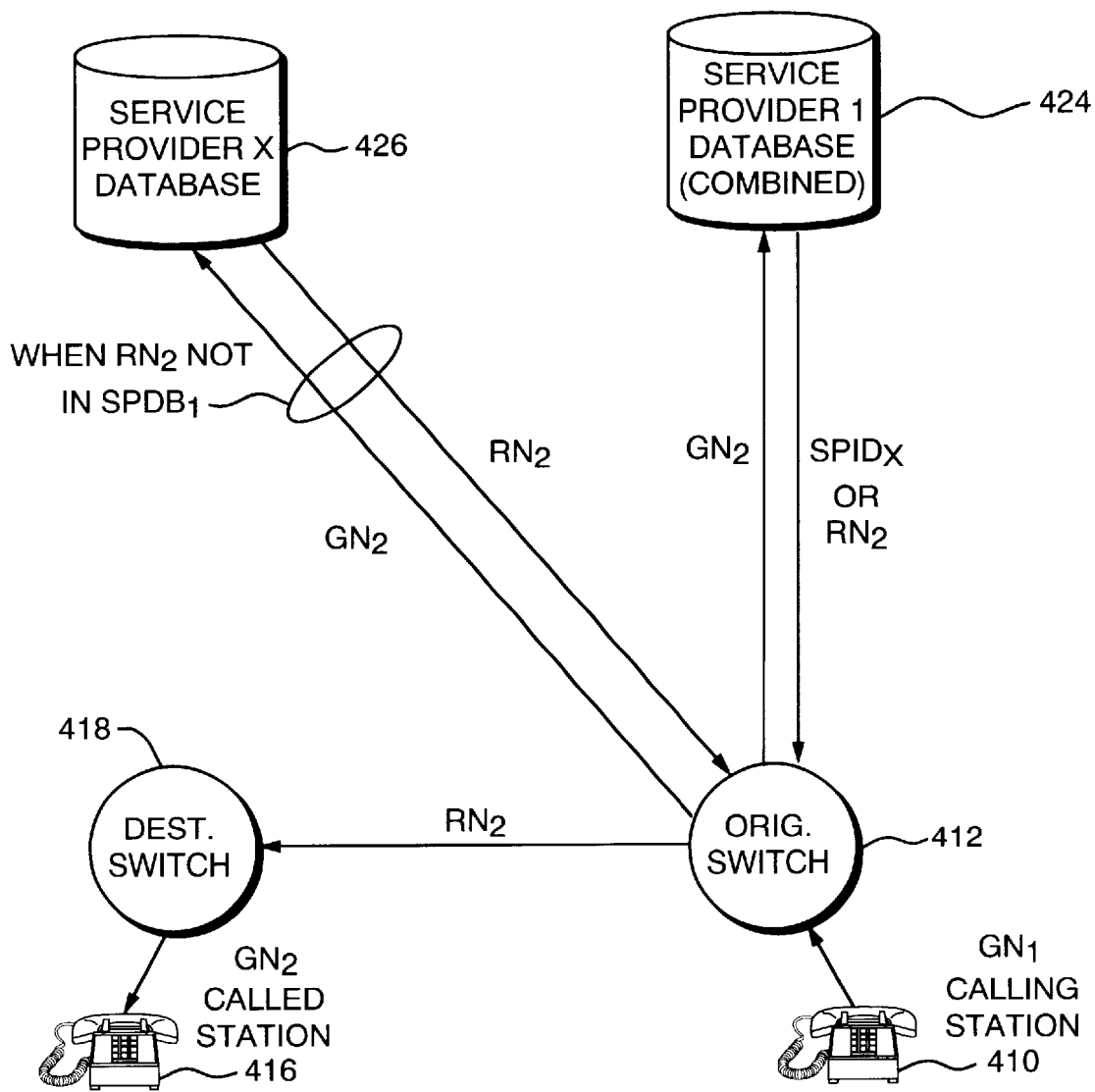
FIG. 9 is a block diagram of a telecommunication system having local number portability in accordance with a fifth embodiment of the invention.
Figure 10:
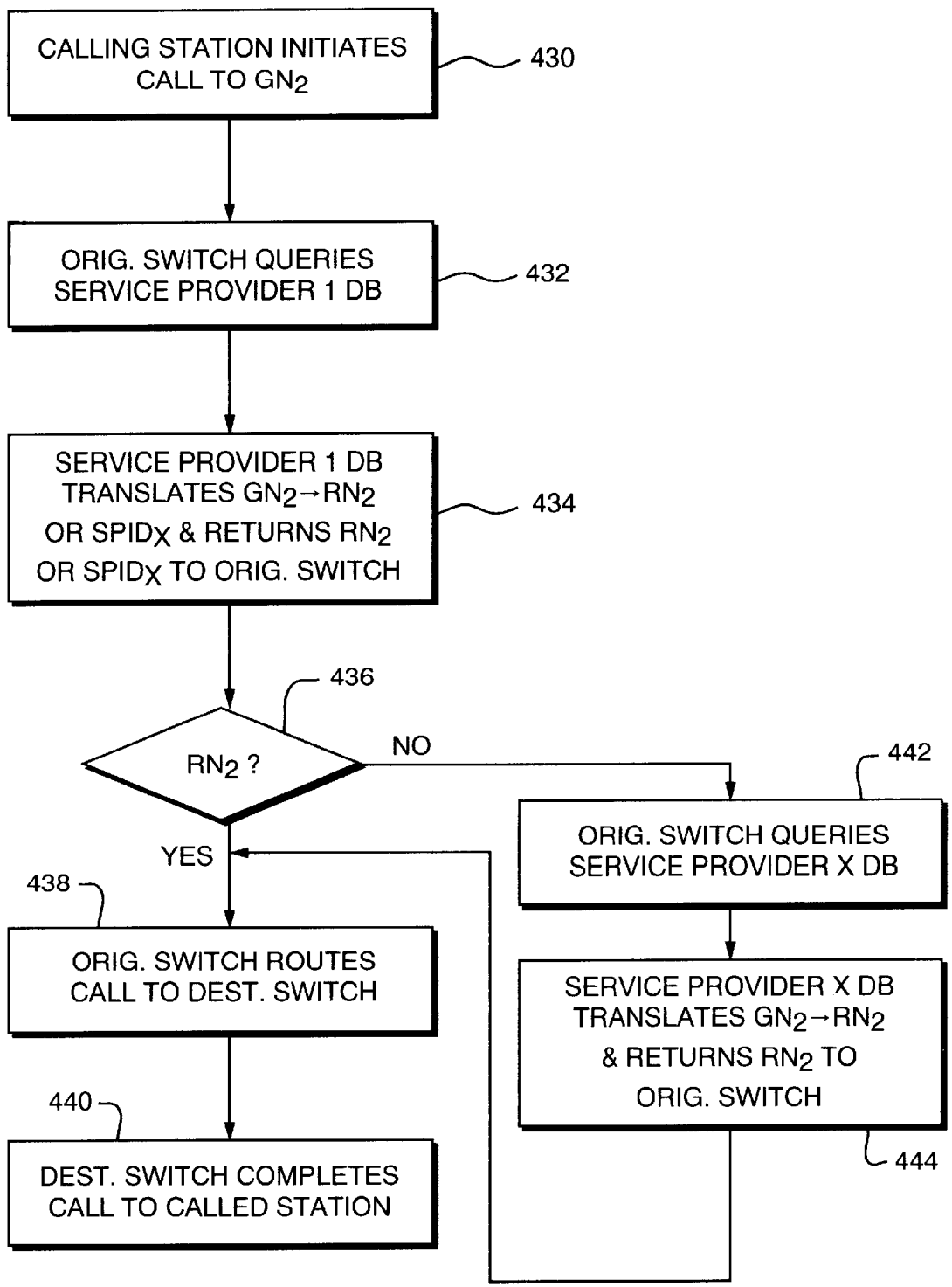
FIG. 10 is a flow diagram illustrating call processing in the telecommunication system of FIG. 9.

A telecommunication system in accordance with a fifth embodiment of the invention is described with reference to FIGS. 9 and 10. A calling station 410 having a geographic number $GN_1$ is connected to an originating switch 412. The originating switch 412 may direct a call to a called station 416 having a geographic number $GN_2$ through a destination switch 418. The originating switch 412 may access a service provider 1 database 424 and may access the databases of other service providers, one of which is illustrated in FIG. 9 as service provider X database 426. The originating switch 412 and the service provider 1 database 424 are controlled by the same service provider.

The service provider 1 database 424 may contain a table for translating a geographic number GN to a routing number RN or to intermediate routing information, such as a service provider identification SPID, a CIC, a TGID or an intermediate switch address. When the dialed geographic number $GN_2$ represents a subscriber of the service provider, the database 424 contains the corresponding routing number $RN_2$. When the dialed geographic number $GN_2$ represents a subscriber of another service provider, the table contains a corresponding service provider identification $SPID_X$ of the service provider for that subscriber. The service provider X database 426 contains similar information. In particular, database 426 may include a routing number RN corresponding to each geographic number GN for its own subscribers and may include a service provider identification SPID corresponding to the geographic numbers of other service providers. Alternatively, the service provider X database 426 may contain only the routing numbers for its own subscribers.

In an alternative embodiment, one or more of the combined service provider databases 424, 426 may include two separate tables. A first table contains information for translating a geographic number for a subscriber of the service provider to a corresponding routing number. A second table contains information for translating a geographic number of a subscriber of another service provider to a service provider identification SPID. The choice of which table to search first depends on the particular environment.

Call processing in the telecommunication system of FIG. 9 is described with reference to the flow diagram of FIG. 10. The calling station 410 initiates a call to called station 416 by forwarding the dialed geographic number $GN_2$ to originating switch 412 in step 430. The originating switch 412 queries service provider 1 database 424 by sending the dialed geographic number $GN_2$ to database 424 in step 432. The service provider 1 database 424 translates the dialed geographic number $GN_2$ to a corresponding routing number $RN_2$ or to a corresponding service provider identification and returns $RN_2$ or $SPID_X$ to the originating switch 412 in step 434. As indicated above, the service provider 1 database 424 contains routing numbers for its own subscribers and contains the service provider identifications for subscribers of other service providers. In step 436, the originating switch 412 determines whether the routing number $RN_2$ was returned by database 424. When the routing number $RN_2$ was returned, the originating switch 412 routes the call to destination switch 418 by forwarding routing number $RN_2$ and any other necessary information in step 438. The destination switch 418 completes the call to the called station 416 in step 440.

When the database 424 does not return routing number $RN_2$, the originating switch 412 queries service provider X database 426, identified by the service provider identification $SPID_X$ returned from database 424, by sending the dialed geographic number $GN_2$ to database 426 in step 442. The service provider X database 426 translates the dialed geographic number $GN_2$ to the corresponding routing number $RN_2$ and returns $RN_2$ to the originating switch 412 in step 444. The originating switch 410 then routes the call to the destination switch 418 in step 438, and the destination switch 418 completes the call to called station 416 in step 440.

A telecommunication system in accordance with a sixth embodiment of the invention is described with reference to FIGS. 11 and 12. The embodiment of FIG. 11 is similar to the embodiment of FIG. 9, except that the service provider 1 database 424 queries the service provider X database 426 directly when the necessary routing number is not contained in database 424.

Figure 11:
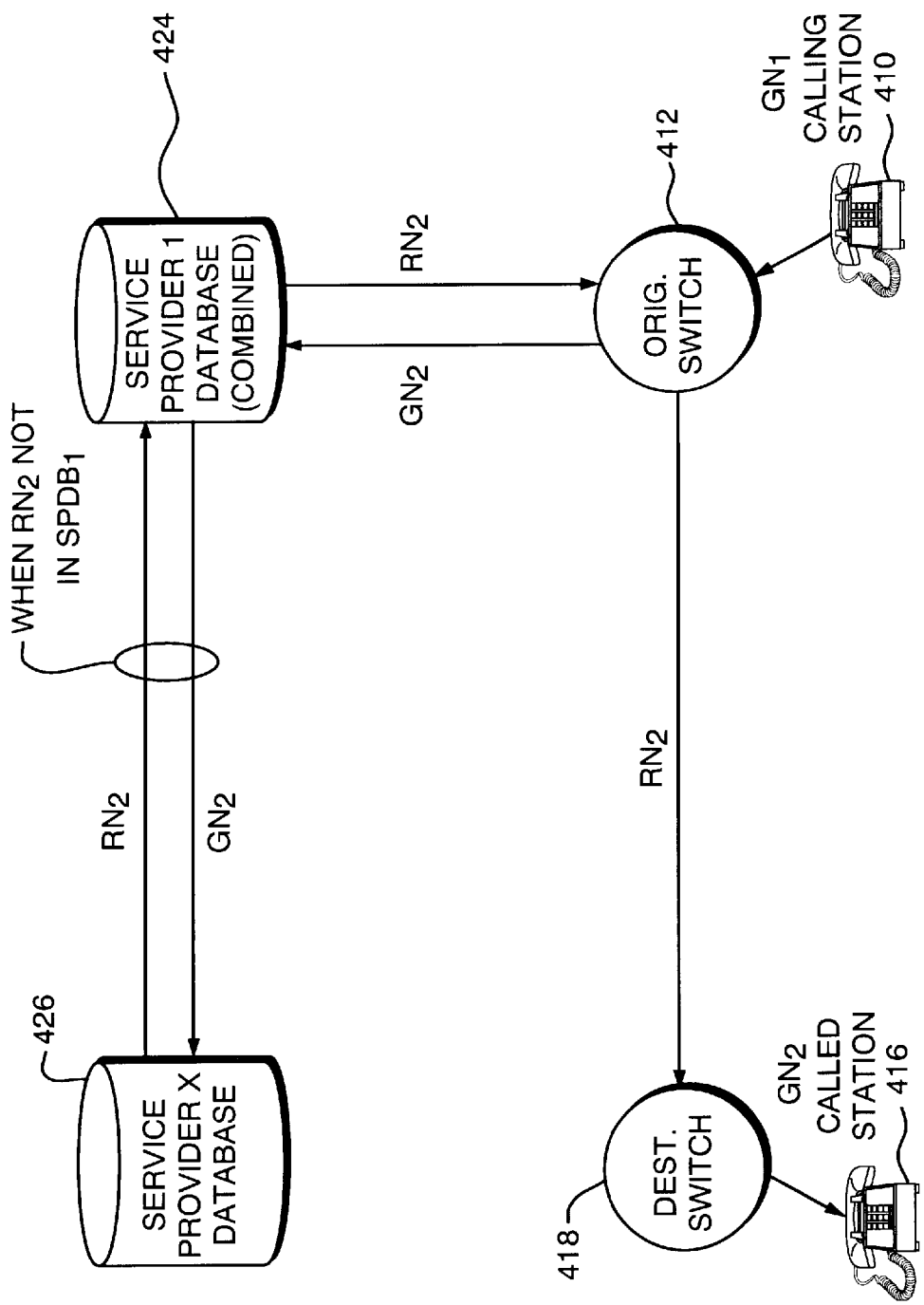
FIG. 11 is a block diagram of a telecommunication system having local number portability in accordance with a sixth embodiment of the invention.
Figure 12:
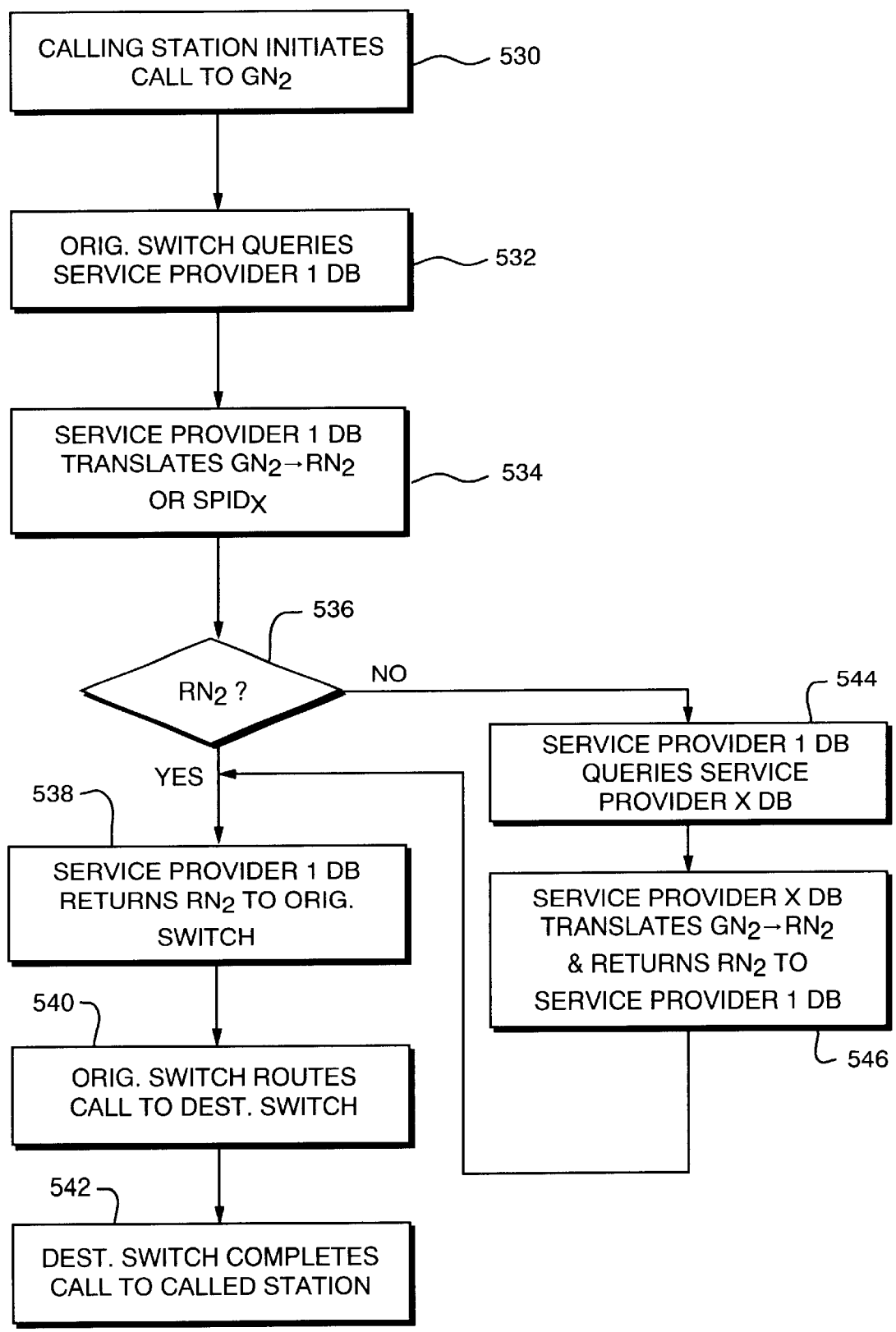
FIG. 12 is a flow diagram illustrating call processing in the telecommunication system of FIG. 11.

Call processing in the telecommunication system of FIG. 11 is described with reference to the flow diagram of FIG. 12. Calling station 410 initiates a call to called station 416 by forwarding the geographic number $GN_2$ of called station 416 to originating switch 412 in step 530. The originating switch 412 queries service provider 1 database by sending dialed geographic number $GN_2$ to database 424 in step 532. The service provider 1 database translates the dialed geographic number $GN_2$ to routing number $RN_2$ or to corresponding service provider identification $SPID_X$. As indicated above, the service provider 1 database 424 contains routing numbers for its own subscribers and contains service provider identifications for subscribers of other service providers. In step 536, the service provider 1 database 424 determines whether the database information corresponding to geographic number $GN_2$ is a routing number or a service provider identification. When the database contains routing number $RN_2$, the service provider 1 databases 424 returns $RN_2$ to originating switch 412 in step 538. The originating switch 412 routes the call to destination switch 418 by sending the routing number $RN_2$ and any other necessary information in step 540. The destination switch 418 completes the call to called station 416 in step 542.

When the service provider 1 database 424 contains a service provider identification corresponding to dialed number $GN_2$, the database 424 queries the service provider X database 426 by forwarding the dialed geographic number $GN_2$ to database 426 in step 544. The service provider X database 426 translates the dialed geographic number $GN_2$ to the corresponding routing number $RN_2$ and returns $RN_2$ to the service provider 1 database 424 in step 546. Since the called station 416 is a subscriber of service provider X, service provider X database 426 contains the routing number $RN_2$ corresponding to dialed geographic number $GN_2$. The service provider 1 database 424 then returns $RN_2$ to originating switch 412 in step 538, and the call is completed as described above in connection with steps 540 and 542.

As described above, a wide variety of database configurations may be utilized within the scope of the present invention. A global database may contain all necessary routing information as described in connection with FIG. 1. In another configuration, a global database may contain a reference to a service provider database as described in connection with FIGS. 3 and 5. In a further configuration, a global database may contain a carrier identification code CIC and/or a trunk group identification TGID, or an intermediate switch address ISA, which is used by an intermediate switch to access a service provider database as described in connection with FIG. 7. In yet another configuration, service provider databases may contain combined information including routing numbers for their own subscribers and intermediate information, such as service provider identifications, for subscribers of other service providers. In any of the configurations shown, the database may return a carrier identification code CIC, a trunk group identification TGID or other intermediate routing information. More generally, the database returns either the final routing information used for routing of the call to a final destination or intermediate routing information used by an intermediate switch for accessing the final routing information. Naturally, additional database queries require additional time and may degrade call processing performance. However, the technique selected depends, in part, on the speed with which database queries can be processed and the delay which is acceptable to the subscriber.

The routing number RN used for call routing may contain different information, depending on the configuration of the system. In a first configuration, the routing number is a physical address indicating the geographical location of the destination switch that serves the dialed geographic number. Thus, the routing number RN is a switch identification number. The format of the routing number may utilize a six-digit format such as NPA+NXX or a ten-digit format such as NPA+NXX+XXXX. In this first configuration, only one number is required to serve as the routing number for all subscribers served by a switch. In this first configuration, the dialed geographic number GN is sent with the routing number RN to uniquely identify the called station.

In a second configuration, each subscriber is assigned an NANP routing number having the format NPA+NXX+XXXX from the serving switch. In this second configuration, the routing number uniquely identifies the serving switch and the subscriber. Thus, a geographic number GN and a routing number RN are assigned to each subscriber. However, only the geographic number GN is known to the subscriber. The routing number RN is used by the network for call routing. In the second configuration, it is not necessary to send the dialed geographic number $GN_2$ to the serving switch, since the routing number $RN_2$ uniquely identifies the subscriber. However, it may be desirable to transmit the dialed geographic number $GN_2$ for other purposes, such as billing.

It is likely that some switches in the network will not have the capability of querying a database for supporting local number portability. In that case, the switch will forward the dialed geographic number to a switch that is capable of supporting local number portability.

When the local portability routing number and the geographic number both have ten digit NANP formats, it is necessary to indicate to the receiving switch whether the transmitted number is a geographic number or a routing number. In one approach, a separate indicator bit or indicator word in transmitted message identifies the transmitted number as a routing number or as a geographic number. In another approach, the dialed geographic number is transmitted on one trunk, while the routing number is transmitted on a different trunk. The receiving switch identifies the number it receives based on the trunk on which the number is received. In cases where the routing number has a different number of digits from the geographic number (such as a six-digit routing number), a separate indicator is not required.

The communication of routing information between switches may utilize the SS7 ISUP signaling protocol. It will be understood that the present invention is not limited to the use of the above signaling protocols. In general, any signaling protocol capable of carrying the required information may be utilized. When the SS7 signaling protocol is utilized, the switch may include the following information in the initial address message (IAM): (1) the dialed geographic number GN may be included in the generic address parameter (GAP); (2) the translated routing number RN may be included in the called party address parameter; (3) the NPA+NXX of the originating switch may be included in the jurisdiction information parameter (JIP); (4) the calling party's geographic number GN may be included in the calling party address parameter; and (5) the calling party's routing number RN (if the calling party is also an LNP subscriber) may be included in another GAP with the appropriate indicator. The calling party's geographic number and routing number is included in the IAM message for billing purposes. The calling party's geographic number indicates to the billing system who to charge the call to. The calling party's routing number allows the billing system to distance rate call. The billing system also needs the called party's routing number for call rating. The called party's routing number can also be returned in the Address Complete Message, the Answer Message, the Release Message or the Release Complete Message.

The service provider identification SPID can be an address (e.g., an SS7 point code and system number) for a service provider database as required by the local number portability architecture, a carrier identification code (CIC), trunk group identification (TGID), an intermediate switch address, etc. When the SPID is the service provider's database address, then the querying service provider's database may make a query to the serving service provider's database for routing information. When the SPID is a CIC, TGID, switch address, etc., the call is routed using the SPID information for further call handling.

The local number portability architecture described herein specifies that the originating switch queries a service provider database or a global database. If the originating switch does not have query capability, the switch may route the call to a downstream switch having query capability to perform the number translation process before call delivery is initiated. The switch to database interface can be implemented by the Intelligent Network (IN) or the Advanced Intelligent Network (AIN) protocol. If the switch to database interface is AIN based, then the Intelligent Network Application Part (INAP) protocol is employed for the query and response interactions. If the interface is IN based, then a new application part based on the Transaction Capabilities Application Part (TCAP) protocol may be used.

Figure 13:
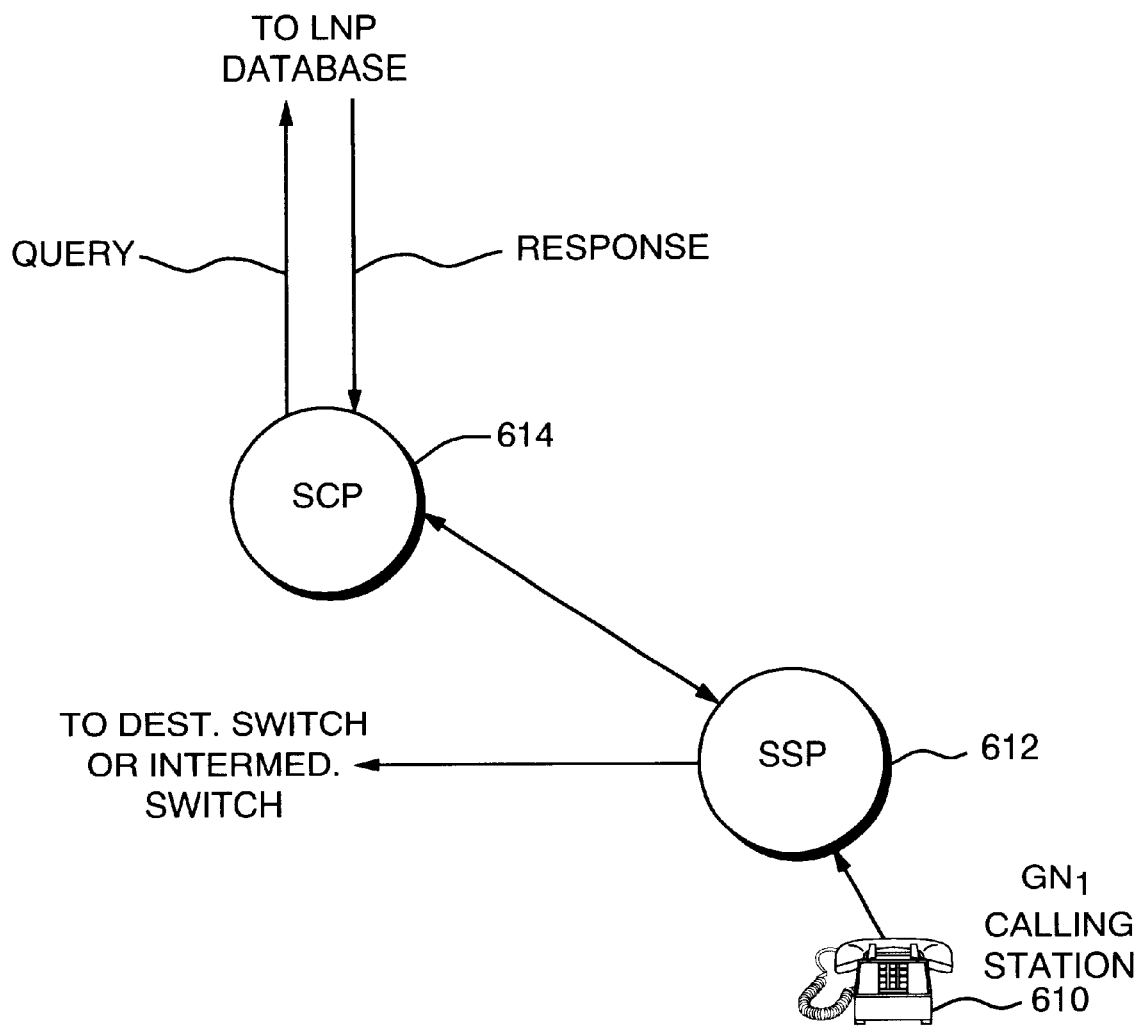
FIG. 13 is a block diagram of an AIN local number portability switch in accordance with the invention.

When the AIN architecture is used, the local number portability switch may be implemented as a service switching point (SSP) controlled by a service control point (SCP). In this configuration, the SCP contains the intelligence for the SSP switch. A block diagram of an AIN local number portability switch is shown in FIG. 13. Calling station 610 is connected to an SSP 612, which is controlled by an SCP 614. The SCP typically contains a database for implementing advanced network functions.

The SCP 614 may contain no LNP routing information. In this case, the SCP 614-queries an LNP database to obtain the required LNP routing information. The LNP database may be a global LNP database, a service provider database or a combined service provider database, as discussed above. The LNP routing information may be final routing information or intermediate routing information. When intermediate routing information is received by the SCP 614, the SCP 614 queries a second database to obtain the LNP routing number or controls the SSP 612 for routing the call to an intermediate switch. The intermediate switch queries a second LNP database to obtain the LNP routing number.

In another configuration, the SCP 614 contains an LNP database. The LNP database within the SCP 614 may be a global LNP database, a service provider database or a combined service provider database. The LNP database within the SCP 614 may contain final routing information or intermediate routing information. When the SCP 614 contains intermediate routing information, it queries a second LNP database to obtain the LNP routing number or controls the SSP 612 for routing the call to an. intermediate switch.

The intermediate switch queries a second LNP database to obtain the LNP routing number. The AIN architecture may be utilized in the telecommunication systems shown in FIGS. 1, 3, 5, 7, 9 and 11 and described above.

The local number portability architecture shown and described herein has a number of advantages over prior techniques, such as the foreign exchange service. The disclosed local number portability technique avoids the requirement for physically connecting the telephone user's phone to the previous service end office when the subscriber moves or changes service providers. Once the subscriber activates local number portability, other subscribers can reach them using their current telephone number even after they relocate anywhere within the local number portability boundary, change service providers or subscribe to new services. The invention permits the subscriber to select any service provider while retaining his or her-geographic number GN. The invention uses network resources more efficiently than the foreign exchange service. The invention uses a common network infrastructure to support local number portability for all telephone users. The invention does not require additional transmission facilities between the new location and the old location.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for telecommunication call processing, comprising:
   a) providing a local number portability switch and a local number portability database accessible by the local number portability switch, said local number portability database comprising a global database configured to selectively translate a portable geographic number, which represents a subscriber number that is portable to different geographic locations, to a routing number or a service provider identifier (ID) for completing a call to a called station identified by the portable geographic number independent of geographic location of the called station;
   b) in response to initiation of a call to the portable geographic number, said local number portability switch querying the local number portability database using said portable geographic number;
   c) said local number portability database translating the portable geographic number to a corresponding routing number or service provider ID and returning the corresponding routing number or service provider ID to the local number portability switch; and
   d) said local number portability switch using the corresponding routing number or service provider ID to route the call to the called station independent of geographic location of the called station.

2. A method for telecommunication call processing as defined in claim 1 wherein said method further comprises said global database querying a service provider database identified by said service provider ID, said service provider database translating the portable geographic number to a routing number and returning the routing number to the global database, and said global database returning the routing number to said local number portability switch.

3. A method for telecommunication call processing as defined in claim 1 wherein said method further comprises said global database returning a corresponding service provider ID to said local number portability switch, said local number portability switch querying a service provider database identified by the service provider ID, said service provider database translating the portable geographic number to a corresponding routing number and returning the corresponding routing number to the local number portability switch.

4. A method for telecommunication call processing as defined in claim 1 wherein said local number portability database comprises a single table for translating said portable geographic number to said routing number or said service provider ID.

5. A method for telecommunication call processing as defined in claim 1 wherein said local number portability database comprises a first table for translating the portable geographic number to said routing number and a second table for translating the portable geographic number to said service provider ID.

6. A method for telecommunication call processing as defined in claim 1 wherein step d) comprises said local number portability switch sending a first information packet comprising said routing number or said portable geographic number and a second information packet comprising said portable geographic number to a second switch, said routing number comprising a destination switch identification.

7. A method for telecommunication call processing as defined in claim 6 wherein step d) comprises said local number portability switch sending said first and second information packets to said second switch on a first trunk when said first information packet contains said routing number and sending said first and second information packets to said second switch on a second trunk when said first information packet contains said portable geographic number.

8. A method for telecommunication call processing as defined in claim 6 wherein step d) further comprises said local number portability switch sending to said second switch an indication whether said first information packet contains said routing number or said portable geographic number.

9. A method for telecommunication call processing as defined in claim 6 wherein said routing number and said portable geographic number have different numbers of digits, wherein the number of digits in said first information packet indicates whether said first information packet contains said routing number or said portable geographic number.

10. A method for telecommunication call processing as defined in claim 1 wherein said local number portability database comprises a database for mapping the portable geographic number to a carrier identification code (CIC), a trunk group identification (TGID) or an intermediate switch address (ISA), wherein step c) includes said global database returning the CIC, TGID or ISA to the local number portability switch and wherein step d) comprises said local number portability switch directing the portable geographic number to a switch identified by the CIC, TGID or ISA.

11. A method for telecommunication call processing as defined in claim 1 wherein said local number portability database comprises a first service provider database for mapping the portable geographic number to a routing number for subscribers of the first service provider and for mapping the geographic number to a service provider ID for subscribers of other service providers, said method further comprising the steps of said service provider database returning said service provider ID to the local number portability switch, said local number portability switch querying a second service provider database identified by the service provider ID using said portable geographic number, said second service provider database translating the portable geographic number to a corresponding routing number and returning the corresponding routing number to the local number portability switch.

12. A method for telecommunication call processing as defined in claim 1 wherein said local number portability database comprises a first service provider database for mapping the portable geographic number to a routing number for subscribers of the first service provider and for mapping the portable geographic number to a service provider ID for subscribers of other service providers, said method further including the steps of said service provider database querying a second service provider database identified by the service provider ID using said portable geographic number, said second service provider database translating the portable geographic number to a corresponding routing number and returning the corresponding routing number to the first service provider database, said first service provider database returning the routing number to the local number portability switch.

13. A method for telecommunication call processing as defined in claim 1 wherein step d) comprises said local number portability switch sending an information packet comprising said routing number or said portable geographic number to a second switch, said routing number comprising a destination switch identification and a subscriber identification.

14. A method for telecommunication call processing as defined in claim 13 wherein step d) further comprises said local number portability switch sending said portable geographic number to said second switch.

15. A method for telecommunication call processing as defined in claim 13 wherein step d) further includes said local number portability switch sending to said second switch an indication whether said information packet contains said routing number or said portable geographic number.

16. A method for telecommunication call processing as defined in claim 13 wherein step d) comprises said local number portability switch sending said information packet to said second switch on a first trunk when said information packet contains said routing number and sending said information packet to said second switch on a second trunk when said information packet contains said portable geographic number.

17. A method for telecommunication call processing as defined in claim 1 wherein step d) comprises said local number portability switch sending said routing number and said portable geographic number to a destination switch, said routing number comprising a destination switch identification.

18. A method for telecommunication call processing as defined in claim 1 wherein step d) comprises said local number portability switch sending said routing number to a destination switch, said routing number comprising a destination switch identification and a subscriber identification.

19. A method for telecommunication call processing as defined in claim 1 wherein said routing number returned to the local number portability switch comprises final routing information.

20. A method for telecommunication call processing as defined in claim 1 wherein said local number portability switch comprises an originating switch connected to a calling station.

21. A method for telecommunication call processing as defined in claim 1 wherein said portable geographic number comprises a North American Numbering Plan (NANP) number.

22. A method for telecommunication call processing as defined in claim 1 wherein said routing number returned to the local number portability switch comprises intermediate routing information used for accessing final routing information.

23. Apparatus for telecommunication call processing comprising:

a local number portability switch; and a local number portability database accessible by the local number portability switch, said local number portability switch including means responsive to initiation of a call to a portable geographic number for querying said local number portability database using the portable geographic number, said portable geographic number representing a subscriber number that is portable to different geographic locations, said local number portability database comprising a global database configured to selectively translate said portable geographic number to a corresponding routing number or service provider identifier (ID) for completing the call to a called station identified by the portable geographic number, and means for returning the corresponding routing number or service provider ID to the local number portability switch, said local number portability switch including means responsive to the corresponding routing number or service provider ID for routing the call to the called station independent of geographic location of the called station.

24. Apparatus for telecommunication call processing as defined in claim 23 wherein said local number portability database comprises a service provider database identified by said service provider ID for translating the portable geographic number to a routing number.

25. Apparatus for telecommunication call processing as defined in claim 23 wherein said routing number includes a destination switch identification.

26. Apparatus for telecommunication call processing as defined in claim 23 wherein said routing number includes a destination switch identification and a subscriber identification.

27. Apparatus for telecommunication call processing as defined in claim 23 wherein said local number portability database comprises a database for mapping the portable geographic number to a carrier identification code (CIC), a trunk group identification (TGID) or an intermediate switch address (ISA) and a service provider database identified by the CIC, TGID or ISA for translating the portable geographic number to a corresponding routing number.

28. Apparatus for telecommunication call processing as defined in claim 23 wherein said local number portability database comprises a first service provider database for mapping the portable geographic number to a routing number for subscribers of the first service provider and for mapping the portable geographic number to a service provider ID for subscribers of other service providers, and a second service provider database identified by the service provider ID for mapping the portable geographic number to a routing number.

29. Apparatus for telecommunication call processing as defined in claim 23 wherein said portable geographic number comprises a North American Numbering Plan (NANP) number.

30. Apparatus for telecommunication call processing as defined in claim 23 wherein said local number portability switch comprises an originating switch connected to a calling station.

31. Apparatus as defined in claim 23 wherein said local number portability switch comprises a service switching point (SSP) and a service control point (SCP) operatively connected to said SSP, and wherein said local number portability database comprises a database within said SCP.

32. Apparatus as defined in claim 23 wherein said local number portability switch comprises a service switching point (SSP) and a service control point (SCP) operatively connected to said SSP, and wherein said local number portability database comprises a database that is accessible by said SCP.

33. A method for telecommunication call processing, comprising:

a) providing a local number portability switch and a local number portability database accessible by the local number portability switch, said local number portability database comprising a global database configured to selectively translate a portable geographic number to a corresponding routing number or service provider identifier (ID) for completing a call to a called station identified by the portable geographic number; and b) in response to initiation of a call to the portable geographic number, said local number portability switch using the portable geographic number to obtain routing information from the local number portability database and routing the call to the called station using the routing information.

34. A method for telecommunication call processing as defined in claim 33 wherein said method further comprises said global database querying a service provider database identified by said service provider ID, said service provider database translating the portable geographic number to a routing number and returning the routing number to the global database, and said global database returning the routing number to said local number portability switch.

35. A method for telecommunication call processing as defined in claim 33 wherein said local number portability database comprises a first service provider database for mapping the portable geographic number to a routing number for subscribers of the first service provider and for mapping the geographic number to a service provider ID for subscribers of other service providers, said method further comprising said service provider database returning said service provider ID to the local number portability switch, said local number portability switch querying a second service provider database identified by the service provider ID using said portable geographic number, said second service provider database translating the portable geographic number to a corresponding a routing number and returning the corresponding routing number to the local number portability switch.

36. A method for telecommunication call processing as defined in claim 33 wherein said method further comprises said global database returning a corresponding service provider ID to said local number portability switch, said local number portability switch querying a service provider database identified by the service provider ID, said service provider database translating the portable geographic number to a corresponding routing number and returning the corresponding routing number to the local number portability switch.

37. A method for telecommunication call processing as defined in claims 33 wherein said local number portability database comprises a first service provider database for mapping the portable geographic number to a routing number for subscribers of the first service provider and for mapping the portable geographic number to a service provider ID for subscribers of other service providers, said method further comprising said service provider database querying a second service provider database identified by the service provider ID using said portable geographic number, said second service provider database translating the portable geographic number to a corresponding routing number and returning the corresponding routing number to the first service provider database, said first service provider database returning the routing number to the local number portability switch.

38. A method for telecommunication call processing as defined in claim 33 wherein step b) comprises said local number portability switch sending a first information packet comprising said routing information or said portable geographic number and a second information packet comprising said portable geographic number to a second switch, said routing information comprising a destination switch identification.

39. A method for telecommunication call processing as defined in claim 33 wherein step b) comprises said local number portability switch sending an information packet comprising said routing information or said portable geographic number to a second switch, said routing information comprising a destination switch identification and a subscriber identification.

* * * * *